Nov. 23, 1943.　　D. G. MERRILL　　2,335,128
LEHR FOR GLASSWARE
Filed Nov. 5, 1941　　7 Sheets-Sheet 1
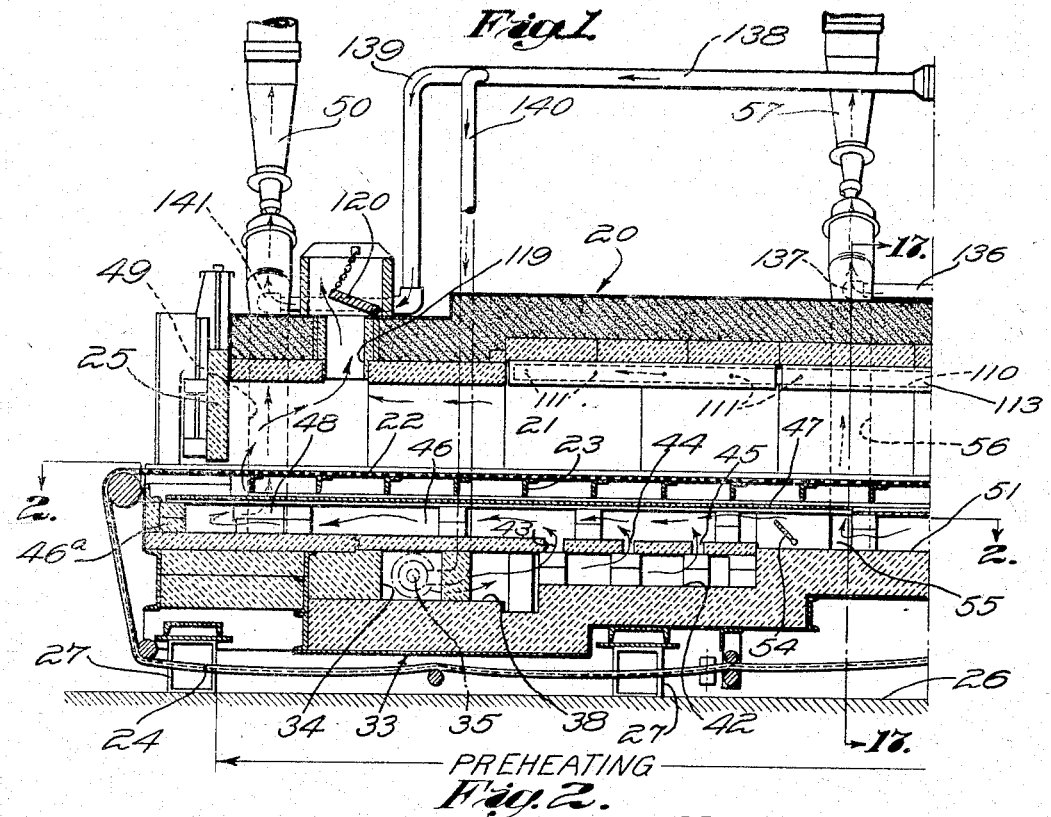
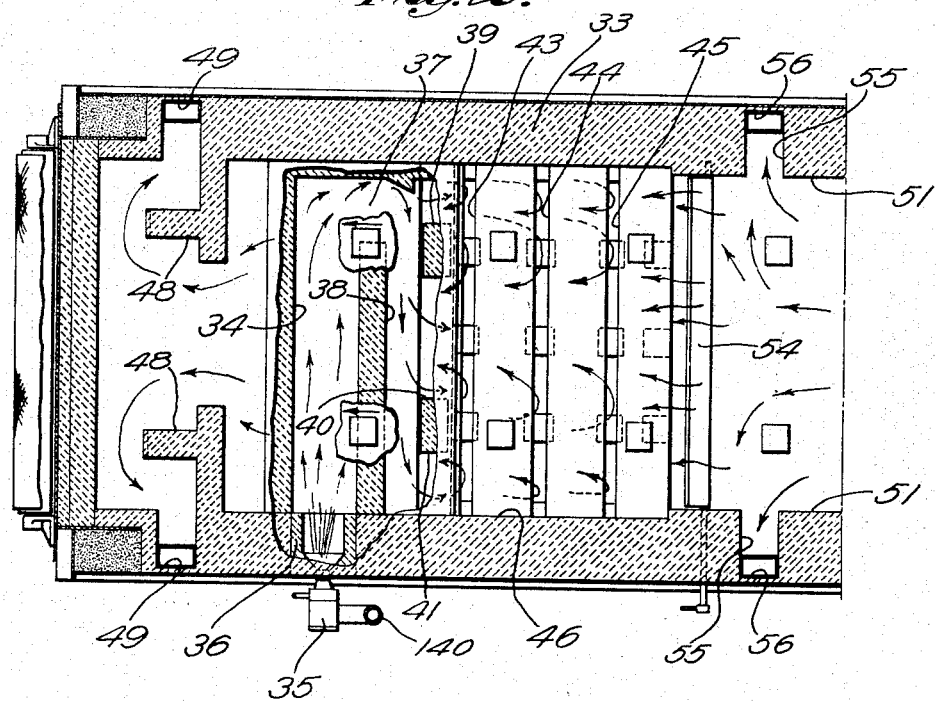
Inventor
Donald G. Merrill
by Brown & Parham
Attorneys Nov. 23, 1943.　　　D. G. MERRILL　　　2,335,128
LEHR FOR GLASSWARE
Filed Nov. 5, 1941　　　7 Sheets-Sheet 2
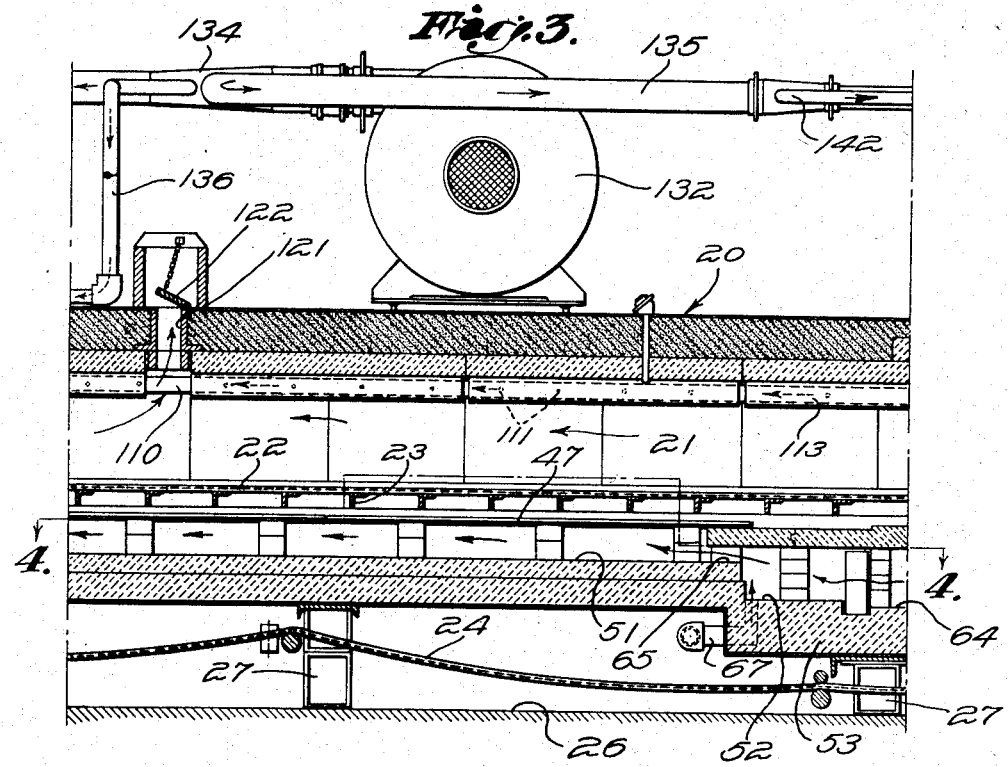
PREHEATING
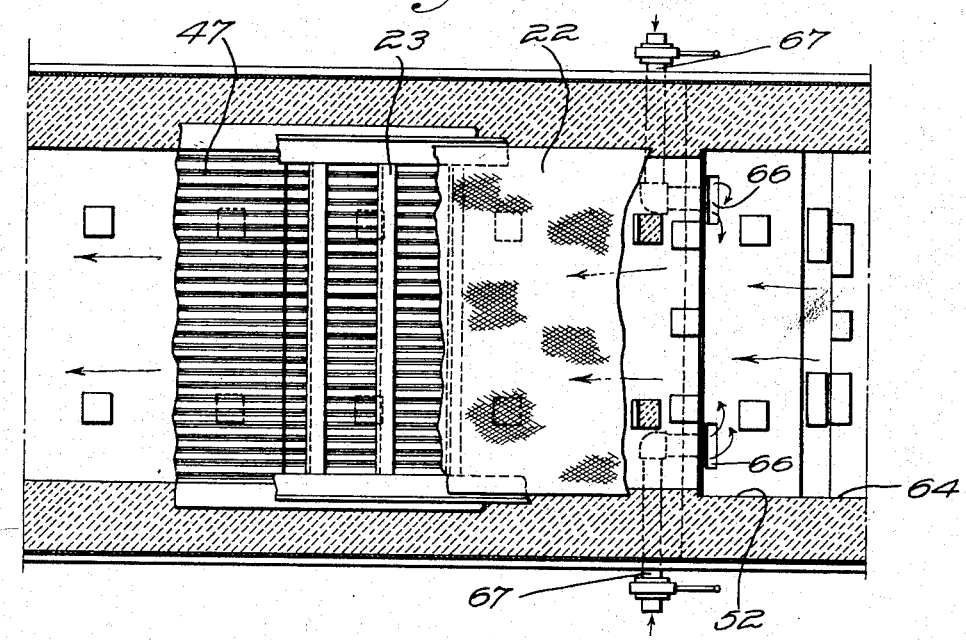
Inventor
Donald G. Merrill Nov. 23, 1943.  D. G. MERRILL  2,335,128
LEHR FOR GLASSWARE
Filed Nov. 5, 1941  7 Sheets-Sheet 3
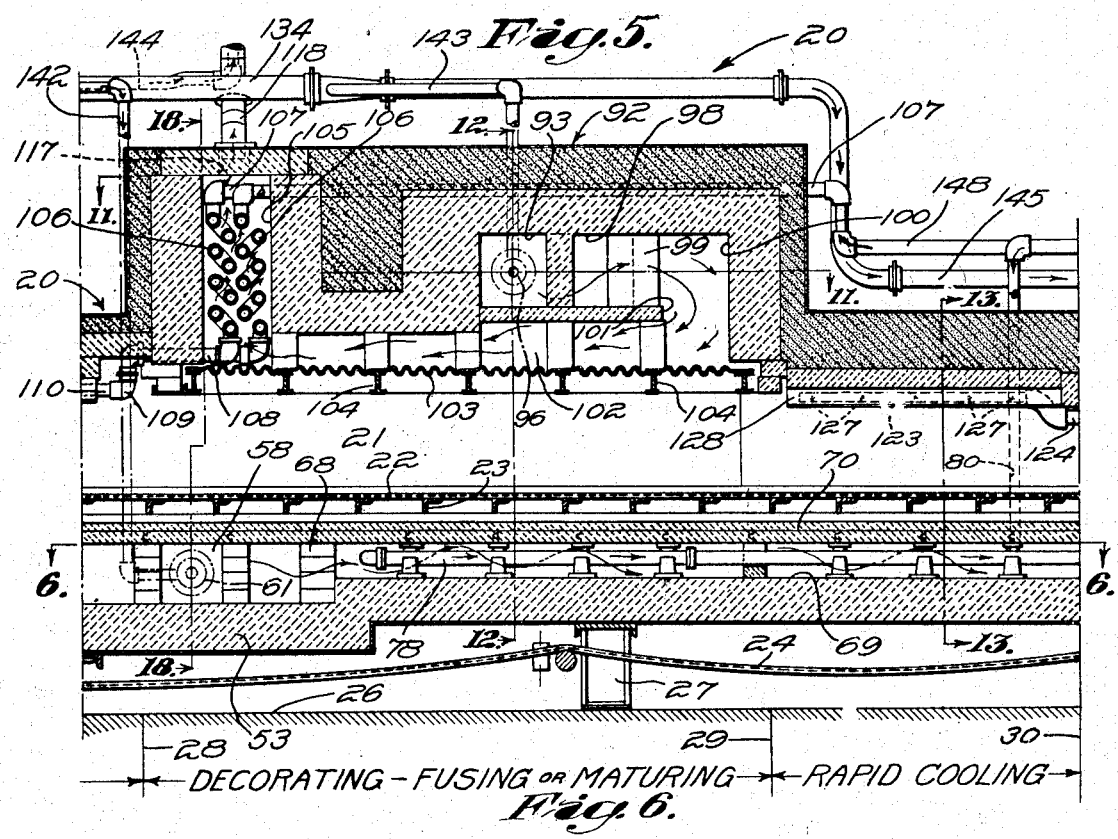
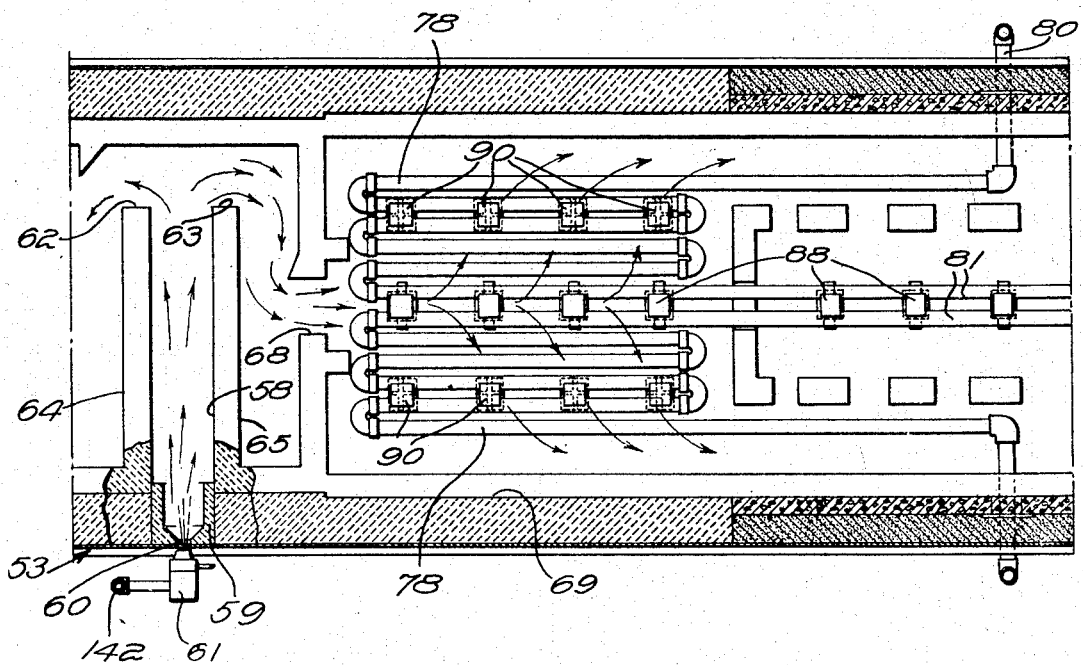

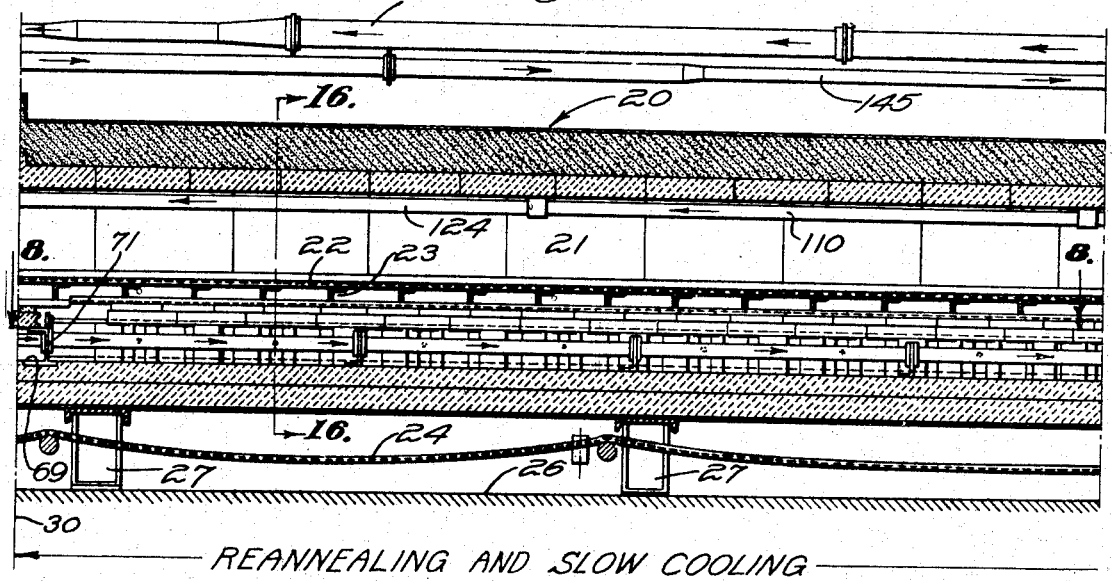
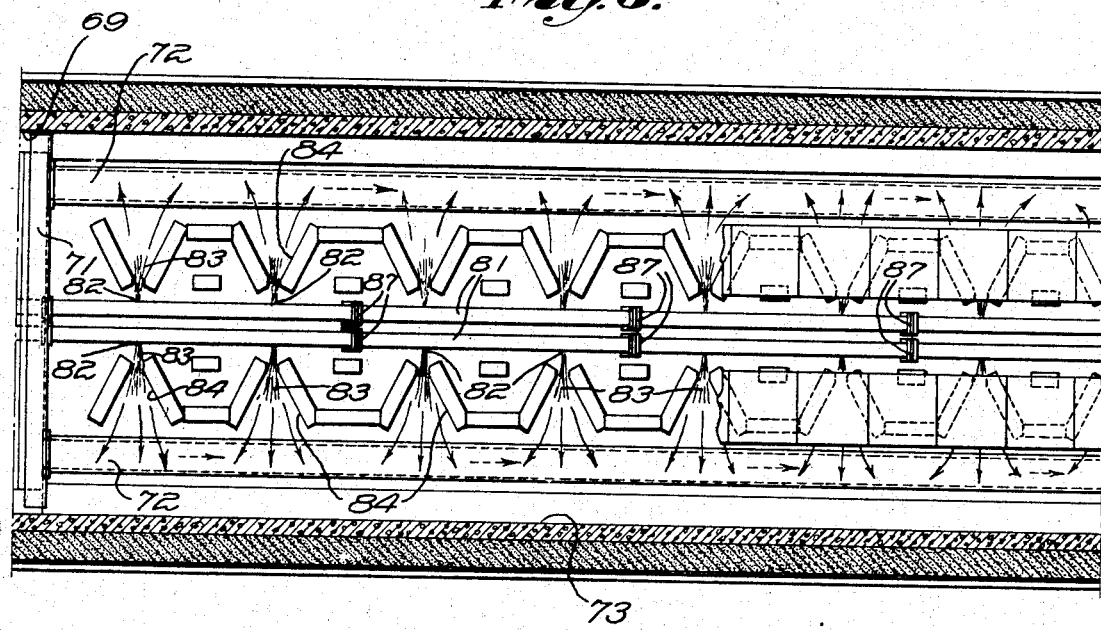

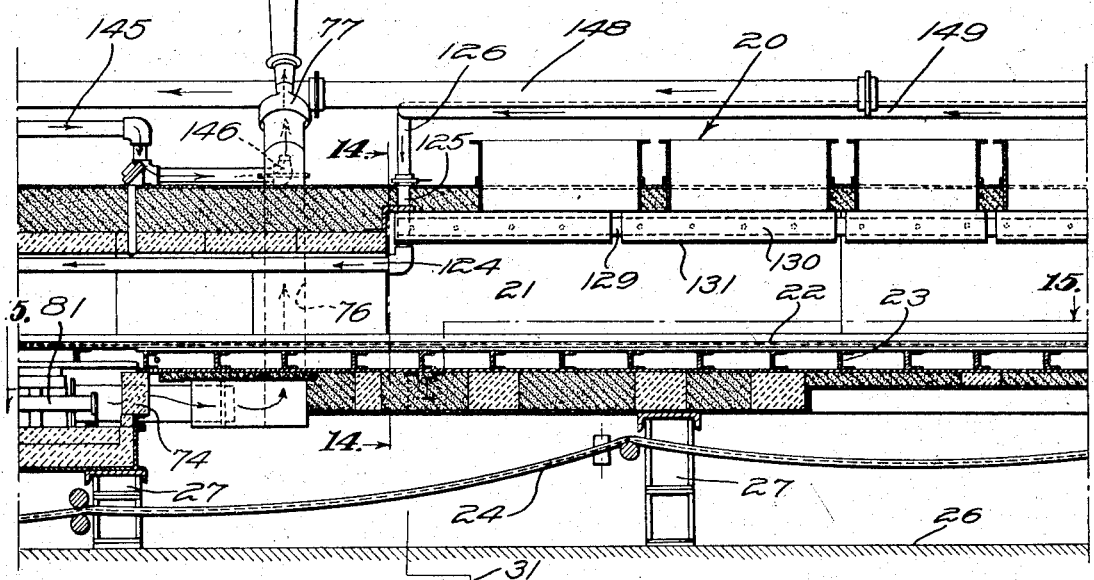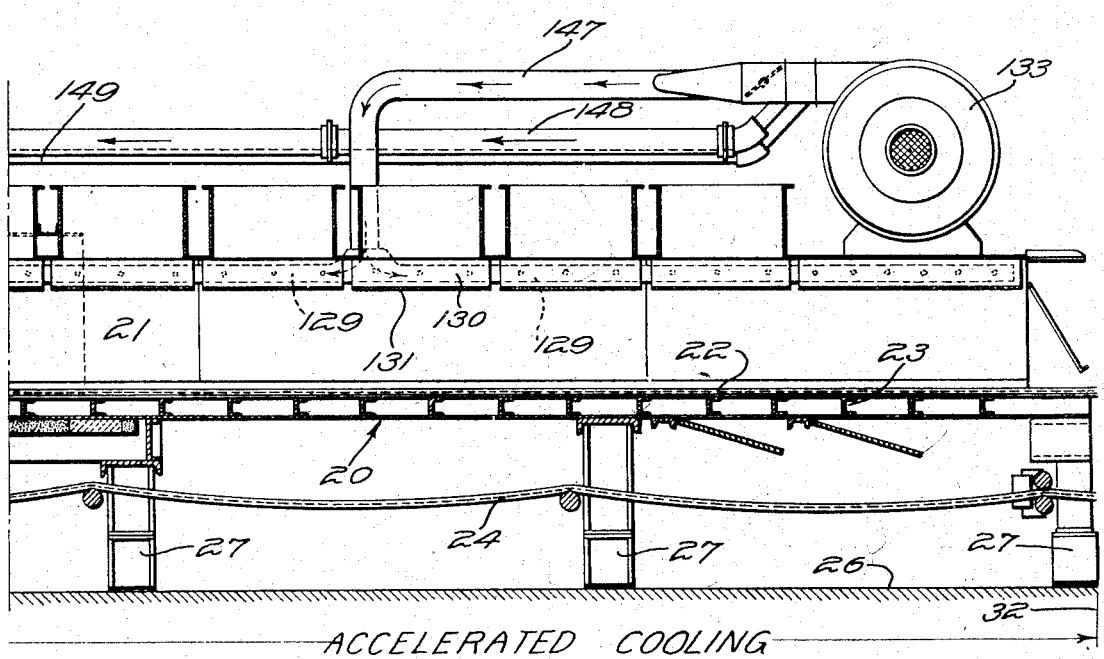

Nov. 23, 1943.   D. G. MERRILL   2,335,128
LEHR FOR GLASSWARE
Filed Nov. 5, 1941   7 Sheets-Sheet 6
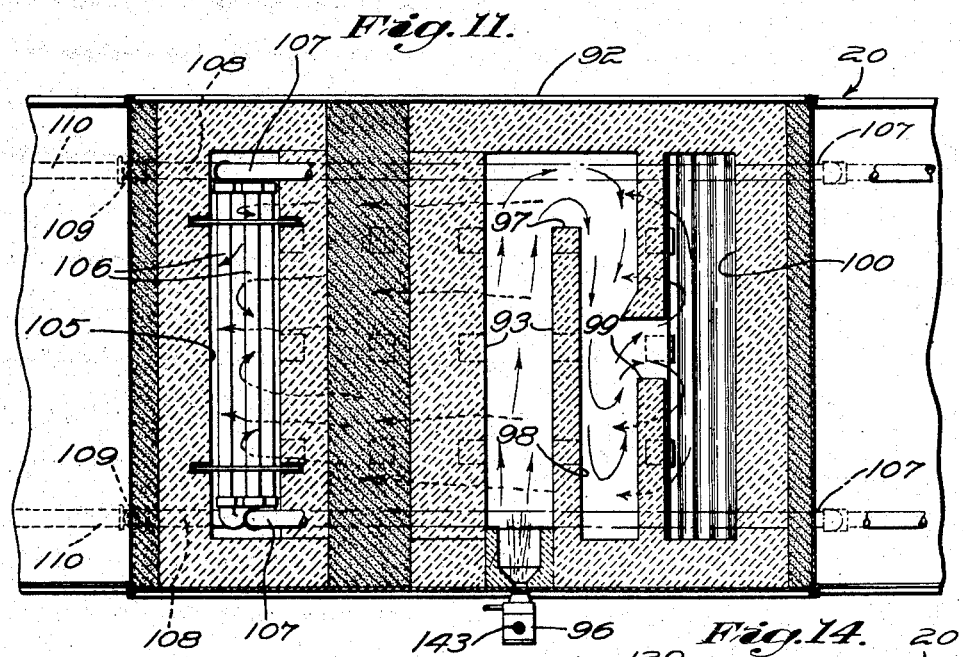
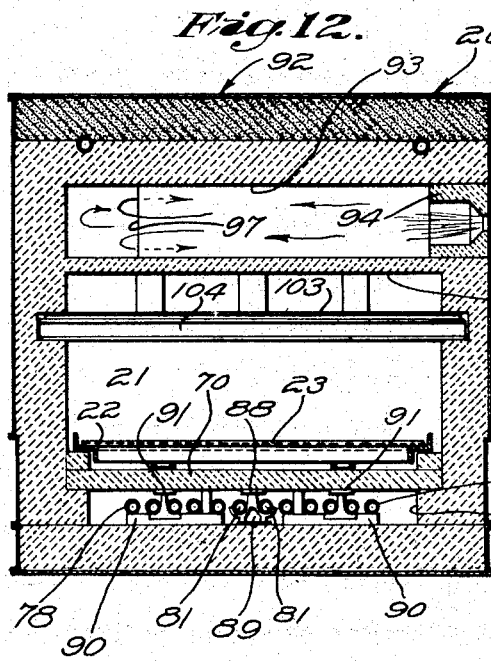
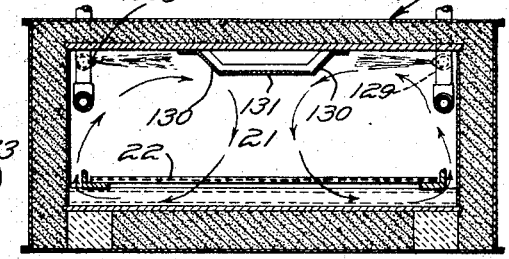
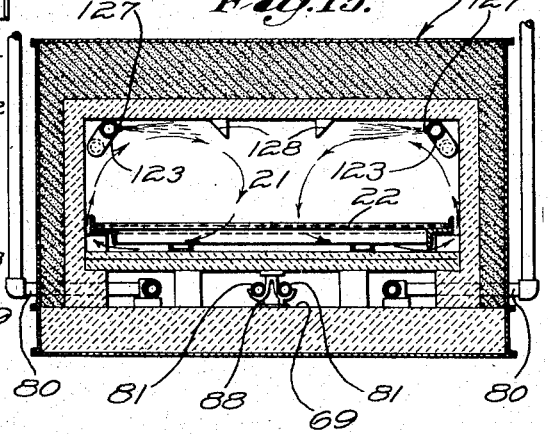
Inventor
Donald G. Merrill
by Brown & Parham
Attorneys Nov. 23, 1943.   D. G. MERRILL   2,335,128
LEHR FOR GLASSWARE
Filed Nov. 5, 1941   7 Sheets-Sheet 7
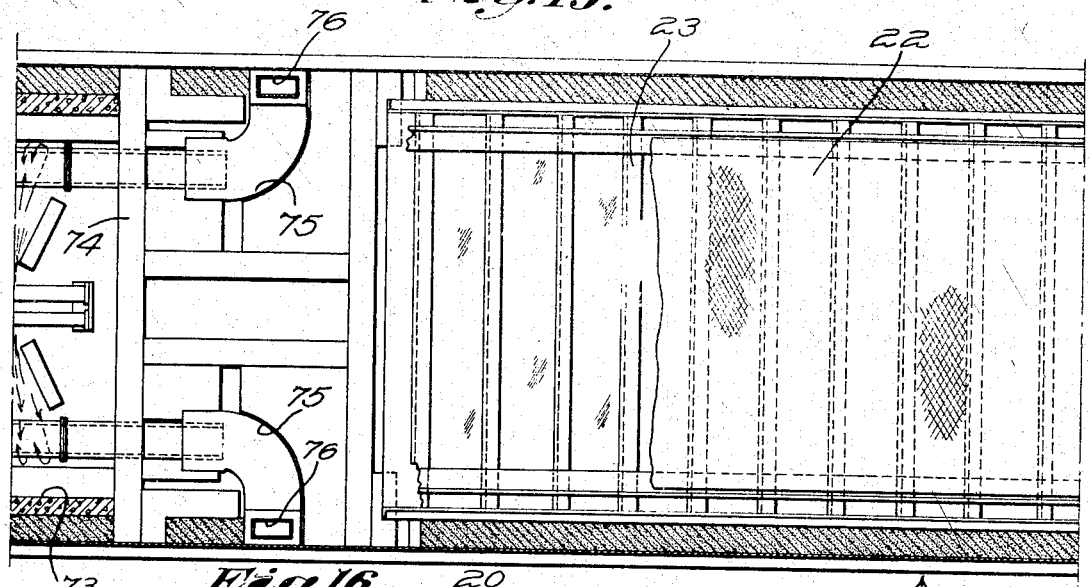
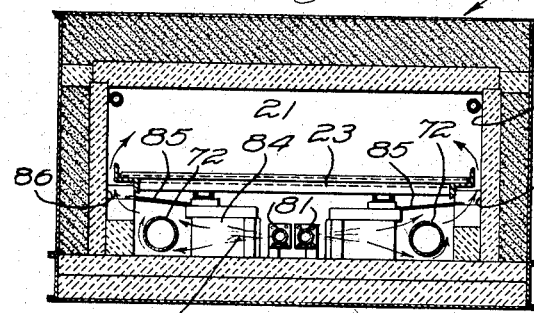
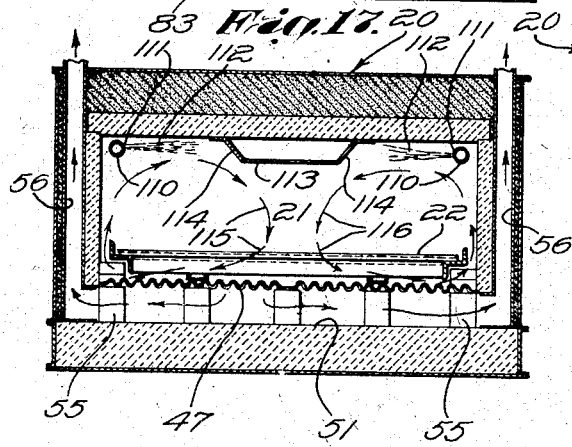
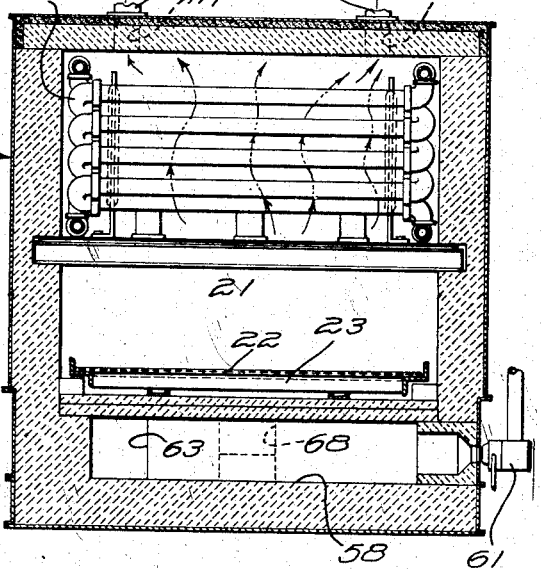
Witness
W. B. Thayer
Inventor
Donald G. Merrill
by Brown & Parham
Attorneys Patented Nov. 23, 1943

2,335,128

UNITED STATES PATENT OFFICE 2,335,128

LEHR FOR GLASSWARE

Donald G. Merrill, West Hartford, Conn., assignor to Hartford-Empire Company, Hartford, Conn., a corporation of Delaware Application November 5, 1941, Serial No. 417,921

13 Claims. (Cl. 49—47)

This invention relates to improvements in lehrs for glassware and more particularly to decorating lehrs for treating glassware on which decorating matter of a ceramic nature has been placed so as first to fuse or mature the decorating matter on the glassware and thereafter to anneal or re-anneal the decorated ware.

The invention is adapted for application to and embodiment in a decorating lehr comprising an elongate open-ended tunnel, an endless conveyor having a portion extending through the tunnel longitudinally thereof for carrying the glassware through such tunnel, and means associated with the tunnel and cooperative therewith to provide the desired temperature controlling and atmospheric environment for the glassware throughout the passage of such glassware through the lehr tunnel.

An object of the invention is to provide a glassware decorating lehr of the character described having novel heating and temperature controlling provisions for utilizing heat resulting from the combustion of a suitable liquid or gaseous fuel to supply heat to the glassware in the lehr tunnel as required and to cause desirable circulatory and other movements of the gaseous media within the tunnel without causing or permitting direct contact with such glassware of any of the products of combustion of the fuel used for the heating of the lehr.

A further object of the invention is to provide a glassware decorating lehr of the character described having combustion chambers and associate heating passages constructed and arranged to heat the tunnel at the places and to the extents desired without introducing the products of combustion of the fuel used into the lehr tunnel and having also an air supply system adapted to perform several different functions in cooperation with the lehr tunnel heating means to aid in controlling temperature conditions in such tunnel. Certain parts of such air supply system are to be located within heating passages of the tunnel heating means and are to be formed to serve as efficient heaters for the air passing therethrough. The air supply system includes suitably located air discharge means for discharging jets of the preheated air into the lehr tunnel.

A further object of the invention is the provision in a lehr of the character described of a tunnel bottom heating system which can be regulated to vary at will the distribution of the heat supplied thereby to the lehr tunnel so that the heating of the glassware entering the lehr may be effected more or less rapidly while the glassware is in the extreme forward end of the lehr tunnel and at various rates during the rearward movement of the glassware in the bottom heated portion of such tunnel.

A still further object of the invention is the provision in a glassware decorating lehr of the character described of improved means for supplying heat to the lehr tunnel at the top thereof, such means including a fire box or combustion chamber located at the top of the tunnel at a substantial distance from the front end of the lehr together with associate means for supplying heat from such top fire box or combustion chamber to the forward end portion of the lehr tunnel at the places desired without the necessity of constructing and using a heating passage extending at the top of the lehr tunnel from the top fire box toward the front end of the lehr.

A further object is to supply a large volume of air in the preheating portion of the lehr effectively to sweep out fumes arising from the drying decorating material and to make good the heat loss inevitable in this ventilation by preheating the ventilating air in an economical manner.

Other objects and advantages of the invention will hereinafter be pointed out or will become apparent from the following description of a practical embodiment of the invention as illustrated in the accompanying drawings, in which:

Fig. 1 is a longitudinal vertical section through the extreme forward end portion of the lehr at about the middle line thereof;

Fig. 2 is a horizontal section taken along the line 2—2 of Fig. 1, showing in part the bottom heating provisions of this portion of the lehr;

Fig. 3 is a view similar to Fig. 1, showing the portion of the lehr next to that of Fig. 1;

Fig. 4 is a longitudinal section along the line 4—4 of Fig. 3;

Fig. 5 is a view similar to Figs. 1 and 3, showing the portion of the lehr succeeding that shown in Fig. 3, this portion of the lehr having both top and bottom heating provisions;

Fig. 6 is a horizontal section along the line 6—6 of Fig. 5;

Fig. 7 is a view similar to Figs. 1, 3 and 5, showing the portion of the lehr immediately succeeding that shown in Fig. 5;

Fig. 8 is a horizontal section through the portion of the lehr shown in Fig. 7, the view being taken along the line 8—8 of Fig. 7;

Fig. 9 is a view like Figs. 1, 3, 5 and 7, showing the next succeeding portion of the lehr;

Fig. 10 is a view like Fig. 9, showing the rear end portion of the lehr tunnel;

Fig. 11 is a section along the line 11—11 of Fig. 5, showing details of the top fire box and associate heating provisions at the top of the lehr tunnel;

Fig. 12 is a transverse vertical section through the lehr at the plane indicated by the line 12—12 of Fig. 5;

Fig. 13 is a transverse vertical section through a portion of the lehr at the plane indicated by the line 13—13 of Fig. 5;

Fig. 14 is a transverse vertical section along the line 14—14 of Fig. 9, showing cooling provisions in the rear end portion of the lehr;

Fig. 15 is a section extending longitudinally of the portion of the lehr shown in Fig. 9, the view being along the line 15—15 of Fig. 9;

Fig. 16 is a transverse vertical section through the lehr tunnel along the line 16—16 of Fig. 7;

Fig. 17 is a transverse vertical section through the lehr tunnel along the line 17—17 of Fig. 1; and Fig. 18 is a transverse vertical section along the line 18—18 of Fig. 5.

A lehr embodying the invention may comprise an elongate substantially horizontal tunnel 20 which is shown in longitudinal vertical section at about its middle line in Figs. 1, 3, 5, 7, 9 and 10 when these views are considered together in consecutive order. The tunnel has a longitudinally extending glassware treatment chamber or passage 21 extending therethrough for the full length thereof.

This chamber or passage may be substantially rectangular in cross-sectional configuration as indicated by the transverse vertical sectional views, Figs. 12, 13, 14, 16, 17 and 18.

An endless conveyor of openwork material, such as woven wire fabric, may be included in the lehr for transporting the glassware to be treated through the lehr tunnel. The upper reach 22 of this endless conveyor passes completely through the lehr tunnel longitudinally thereof and is supported in a horizontal position in the lehr tunnel, preferably adjacent to the floor of the tunnel chamber, by a suitable openwork metallic conveyor supporting and guiding frame structure generally indicated at 23. On leaving the rear end of the tunnel, shown in Fig. 10, the upper reach 22 of the conveyor may pass over a rearwardly extending glassware inspection and packing table (not shown) to a suitable conveyor supporting and driving mechanism (also not shown) at the outer extremity of the ware inspection and packing table. The direction of the conveyor may be changed by this supporting and driving mechanism and the return or idle reach of the conveyor, indicated at 24 in Figs. 1, 3, 5, 7, 9 and 10, is disposed beneath the tunnel structure where it may be supported and guided at intervals by suitable supporting and guiding devices such as those shown in the views just enumerated. At the front of the lehr, the conveyor passes into the longitudinal chamber or passage 21 of the tunnel beneath a vertically adjustable front door or closure 25, as shown in Fig. 1. This front closure or door 25 may be adjusted vertically in practice so that its lower edge is just high enough above the upper reach of the conveyor to afford clearance for the ware on such conveyor during any particular operation. The longitudinal chamber or passage 21 of the lehr tunnel thus may be partly closed at its front end to prevent egress of tunnel atmosphere above the level of the lower edge of the door or closure 25.

As indicated by the showing of Figs. 1, 3, 5, 7, 9 and 10, the tunnel may be supported sufficiently above the level of the factory floor, indicated at 26, to provide space for the return reach of the conveyor belt and also to locate the upper or ware carrying reach of the conveyor at the desired level. The supporting structure employed may consist of a suitable supporting framework, including the upright legs or supporting members 27.

Except as to particular features which hereinafter will be specifically pointed out, the construction of the tunnel walls need not be described in detail. Suitable refractory materials, insulating materials and metallic materials may be employed and relatively arranged to provide lehr tunnel walls which will define the aforesaid tunnel chamber or passage 21 and will be suitable for the desired thermal treatment of the glassware that is being transported through such chamber or passage. Thus, the zones of relatively high temperature will be defined by refractory walls, backed if required by suitable insulation. Other portions of the lehr tunnel, in which the temperatures will be lower, may have walls of less thickness and made of materials having refractory characteristics but of better heat insulating qualities than the refractory materials used in the walls of the hotter portions of the lehr. Still cooler portions of the lehr tunnel may have walls which are made mainly, if not entirely, of metallic members. These features of construction of a lehr tunnel are believed to be sufficiently disclosed by the accompanying drawings without detailed reference thereto in this specification being required.

The present invention contemplates the use of heating and temperature controlling provisions so constructed and arranged as to adapt the lehr to which they are applied for operation by the use of fuels, such as oil and certain gases, the products of combustion of which should be kept out of contact with the glassware undergoing treatment in the tunnel. According to the invention, part of the heat resulting from the combustion of such a fuel is used in a highly efficient and economical manner to preheat air which thereafter is introduced into the lehr tunnel at the desired places along the length of the latter not only to aid in controlling the temperature gradient in the lehr tunnel by the heat exchanging action thereof but positively to set up transverse circulatory movements of gaseous media within the tunnel and as a factor in controlling longitudinal drift of the tunnel atmosphere.

The glassware decorating lehr of the present invention is designed and adapted to accomplish the desired treatment of decorated glassware in a plurality of successive stages. Such glassware may be at a relatively low temperature at the time it is moved into the tunnel on the moving lehr conveyor. It is necessary during the first stage of treatment to heat the ware in the decorating lehr from its relatively low temperature up to the desired high temperature at which the decorating material will fuse on the glass. This latter temperature may be in the order of 100° F. or more above the upper annealing temperature of the ware, i. e., the temperature at which strains in the glass of the ware would be relieved. Thus, the decoration fusing temperature may be 1100° F. to 1150° F. for glass having an upper annealing temperature point of around 1,000° F.

A substantial period of time is required to raise the temperature of the decorated glassware from a relatively low temperature, such as room temperature, to the decoration fusing temperature, during which the ware is being transported through a portion of the lehr tunnel. This period of time may vary according to the starting temperature of the glass, the shape and/or thickness of the walls of the glassware, or other factors which may be involved in the treatment of the ware.

The means for heating the front end portion of the lehr tunnel in accordance with the invention can be regulated to vary the distribution of heat along the preheating portion of the tunnel to a substantial extent to meet different service requirements. The preheating portion of the tunnel may be said to comprise the successive portions of the tunnel shown in Figs. 1 and 3 and to extend into the succeeding portion of the tunnel shown in Fig. 5 approximately to the vertical plane indicated by the line 28 in Fig. 5.

The next portion of the tunnel is provided with suitable heating and temperature controlling provisions to maintain the glassware passing therethrough at the relatively high temperature desired for the fusing of the ceramic decorating material on the glassware. This may be termed the decoration fusing portion of the tunnel and it may be said to extend from the vertical line 28 to the vertical line 29 in Fig. 5. This portion of the tunnel includes heating provisions at the top of the tunnel as well as at the bottom thereof. Of course, the ware will be brought to the relatively high temperature desired by the heating provision in the decoration fusing portion of the tunnel if that temperature has not previously been attained.

The decorating material used may comprise ceramic coloring matter mixed with a suitable vehicle. The treatment of the decorating material on the glassware may be effected advantageously in a sequence of stages or steps. In the first stage, a rapid heating is to be effected to drive off the readily volatile matter. The fumes resulting from this operation are to be removed from the tunnel as rapidly as possible. Some of the vehicle may remain in the decoration as a carbonaceous residue. The removal of this residue requires that the decorating material remain in an oxidizing atmosphere at an elevated temperature, say between 600° and 900° F., for considerable time. The elevation to the final fusing temperature should not take place until the complete burning out of the carbonaceous residue has been accomplished. The lehr of the present invention provides adequate control of the temperatures and conditions within the preheating portion of the tunnel so as to effect treatment of the decorating material on the ware in stages substantially as just described or to effect variations thereof as may be desirable in view of variations in specific decorating materials employed or other conditions or limitations imposed by the nature of the glassware in the lehr.

As hereinbefore stated, the decoration fusing temperature of the glassware may be substantially higher than is required for the relief of strains in the glass of such ware. The decorating lehr embodying the present invention is designed and intended rapidly to reduce the temperature of the recorated glassware to the upper annealing temperature point after such ware leaves the decoration fusing and maturing portion of the tunnel. The rapid cooling portion of the tunnel immediately succeeding the decoration fusing and maturing portion may be said to extend from the vertical line 29 in Fig. 5 to the vertical line 30 at the extreme right hand margin of Fig. 5. This portion of the lehr contains special cooling provisions which will hereinafter be described.

The next portion of the lehr may be employed to effect reannealing of the glassware and slow cooling thereof so as to reduce the temperature of such ware gradually from the upper annealing temperature point or limit, which may be 1,000° F., for example, to the lower annealing temperature point, which may be around 200° lower, as 800° F., for example. It of course will be understood that the particular temperature range may vary considerably for different glasses and that particular temperatures are given herein simply by way of example. The reannealing and slow cooling may be carried on in the portion of the lehr extending from the vertical line 30, at the right hand margin of Fig. 5 and the left hand margin of Fig. 7, though Fig. 7 to the vertical line indicated at 31 in Fig. 9. This portion of the lehr has provisions for cooling the glassware slowly through its critical annealing range so that the ware will have reached its lower annealing temperature by the time it reaches the portion of the lehr indicated by the vertical line 31.

The remainder of the lehr tunnel, extending from the vertical line 31, in Fig. 9, to the rear end of the tunnel as shown in Fig. 10 and as indicated by the vertical line 32 in the latter view, may be employed to effect accelerated cooling of the glassware.

The tunnel heating provisions of the preheating portion of the lehr, Figs. 1, 3, and part of 5, considered together, includes a front bottom fire box 33, Fig. 1. This front fire box has a combustion chamber 34 extending transversely of the bottom wall structure of the tunnel, as indicated by the showing in Fig. 2. A burner 35 may discharge a combustible fuel or fuel mixture through a suitable port in a burner block 36 at one side of the lehr into the combustion chamber 34.

From the combustion chamber 34, flames and products of combustion may pass rearwardly of the lehr through a port 37, Fig. 2, into a transversely extending chamber 38 in which the flames and products of combustion may be diffused and distributed transversely of the lehr. From the chamber 38, the products of combustion may pass rearwardly through several ports, such as those respectively indicated at 39, 40 and 41, in Fig. 2, into an outlet chamber 42, Figs. 1 and 2.

The outlet chamber 42 is provided with a plurality of longitudinally spaced transversely extending ports 43, 44 and 45, respectively, in its top wall. Products of combustion passing through the ports 43, 44 and 45 enter a longitudinally extending heating passage 46, which is provided in the tunnel bottom structure between the fire box 33 and the floor 47 of the front end portion of the tunnel chamber 21. The passage 46 may extend in good heat exchanging relation with the floor 47 of the tunnel chamber forwardly beyond the front fire box to and slightly beyond the front end of the tunnel chamber, and may be closed at its forward end, as indicated at 46a in Fig. 1.

Products of combustion introduced into the passage 46 may pass forwardly of the lehr in such passage to the front end thereof whence they are directed by baffle structures 48, Fig. 2, into vertical flue passages 49 in the side walls of the tunnel. Each of these flue passages 49 leads to a stack 50, Fig. 1.

It will be understood that suitable refractory blocks may be placed at intervals in the fire box chambers 38 and 42 or in either of them, to aid in supporting the refractory top wall of the fire box structure 33 and in breaking up and diffusing the products of combustion during the passage of such products from the burner chamber 34 to the heating passage 46. These products of combustion enter the heating passage 46 at a number of places spaced longitudinally of the lehr tunnel through ports extending the full width of the passage bottom. This heating arrangement provides a relatively smooth or regular temperature gradient in the passage 46 and in the overlying portion of the tunnel chamber 21. Heat of course will radiate from the refractory bottom wall of the passage 46 to the floor 47 of the overlying portion of the ware treatment chamber 21 of the tunnel. The floor 47 may be made of longitudinally corrugated metallic sheet material, Figs. 4 and 17.

The passage 46 may be continuous with a heating passage 51 which, as best seen in Figs. 1 and 3, considered together, extends longitudinally in the bottom wall structure of the lehr tunnel beneath the aforesaid metallic portion 47 of the tunnel chamber floor so as to connect the heating passage 46, Fig. 1, with a delivery chamber 52 of a second bottom fire box 53. The passage 51, like the passage 46, may be nearly or fully as wide as the overlying portion of the tunnel chamber (see Fig. 17).

A transversely extending pivoted damper 54 may be provided in the forward end of the passage 51 at its juncture with the passage 46 to control fluid communication between these two passages. Preferably, this pivoted damper or gate 54 will allow some leakage between these two passages, even when the damper is closed, so as to obviate any sharp break in the temperature influencing effect of these two passages on the floor of the tunnel chamber. The damper may be swung to a substantially horizontal position to allow practically free passage of gases from the passage 51 to the passage 46.

The lehr tunnel structure is provided adjacent to the damper 54 and slightly rearwardly thereof with short lateral outlet branches 55 leading from the longitudinally extending passage 51 to a pair of vertical flue passages 56, each of which may lead to a stack 57. Thus, most, if not all, of the gaseous products of combustion from the second bottom fire box 53 may be withdrawn from heating relation to the floor of the tunnel at the forward end of the passage 51 through the stacks 57, without entering the heating passage 46. On the other hand, the damper 54 may be opened more or less and the stacks 50 and 57 may be operated or controlled to cause more or less of the heated gases and products of combustion passing through the heating passage 51 to enter the heating passage 46 to increase the heat applied through the floor of the tunnel chamber to the extreme front end portion of such chamber.

The bottom fire box 53 is located at the rear end of the preheating portion of the lehr, as shown in Figs. 5 and 6. As shown, this fire box comprises a transversely extending burner or combustion chamber 58, Figs. 5 and 6, which extends transversely of the bottom of the tunnel structure. A burner block 59, located at one side of the lehr bottom structure, is provided with a port 60 through which a burner 61 may project a suitable fuel or fuel mixture into the chamber 58. The chamber 58 is provided at the side of the lehr opposite the burner with a pair of oppositely located front and rear ports 62 and 63, which respectively open into a transversely extending front diffusion chamber 64 and a rear diffusion chamber 65.

From the front diffusion chamber 64, heated products of combustion may pass forwardly into the aforesaid delivery chamber 52, Figs. 3 and 4, whence such products of combustion may pass through ports 65 into the heating passage 51. Air for diffusing and reducing the temperature of the products of combustion may be admitted into the chamber 52 through ports 66 which respectively are located in the floor of the chamber 52 adjacent to the side walls of the tunnel bottom structure. Air from the atmosphere or any other suitable source of supply may be delivered to the ports 66 by pipes 67 (see Fig. 4).

The rear diffusion chamber 65 has a port 68, Figs. 5 and 6, in the rear wall thereof at about the middle portion of such wall, opening into a longitudinally extending heating chamber 69. Chamber 69 may be nearly or fully as wide as the tunnel chamber, Fig. 12, and is separated from the tunnel chamber by the overhead portion 70, Fig. 5, of the tunnel chamber floor. The floor 70 may be made of refractory material having good heat insulating qualities. The chamber 69 may extend rearwardly beneath the tunnel chamber beyond the decoration fusing or maturing portion of the lehr. As shown, Figs. 5, 7 and 8, such chamber extends slightly beyond the rapid cooling portion of the tunnel.

At its rearward end, the chamber 69 may be closed by a transversely extending wall 71, Fig. 8. It communicates at its rearward end with the open forward ends of heating pipes 72 which are fitted in suitable openings in such wall. The pipes 72 extend within a longitudinally extending sub-space 73 beneath the reannealing and slow cooling portion of the tunnel (see Figs. 8 and 15). The pipes 72, which may be of any suitable highly conductive material, lead through a rear wall 74 at the rearward end of the sub-space 73, Figs. 9 and 15, so as to discharge at their rearward ends into outlet passages 75 which communicate with vertical flue passages 76, each leading to a stack 77, Fig. 9.

In the chamber 69, heated products of combustion serve primarily to preheat air in a pair of coil air heaters 78, Figs. 6 and 12. The respective heaters 78 comprise horizontally disposed coils or air conducting convolutions located within the chamber 69, the outer members of such heaters being connected with air supply pipes 80. The latter extend through the opposite side walls of the lehr bottom structure, as clearly shown in Figs. 6 and 13.

The inner members of the heaters 78 are extended in the form of pipes 81 which extend rearwardly in the chamber 69 at the middle portion thereof through the transverse wall 71, Fig. 8, rearwardly of the lehr tunnel in the sub-space 73 at the middle portion thereof as shown in Fig. 8 nearly to the rear end of such sub-space. The pipes 81 may be closed at their rear ends and formed to have discharge openings 82 in their outer sides at intervals along the length of such pipes. Jets of air 83 are discharged from these lateral discharge openings into open-ended outwardly flaring directing passages 84 which direct the expanding jets of air laterally across the heating pipes 72 (see Figs. 8 and 16). Thence, the preheated jets of air, additionally preheated by heat extracted from the pipes 72, pass upwardly beneath baffles 85, Fig. 16, through vertical passages 86 at the sides of the conveyor supporting framework structure into the lehr tunnel chamber 21 and upwardly at the sides of the latter as indicated by the arrows in Fig. 16.

The pipes 81 may be supported at intervals within the sub-space 73 by suitable supporting brackets 87, Fig. 8. Within the chamber 69, these pipes may be supported by suitable castings 88, Figs. 6 and 12. The castings 88 may be provided with longitudinally extending apertures 89, Fig. 12, in their lower portions, to permit longitudinal movement of the heated products of combustion in the chamber 69 at the longitudinal median portion thereof. These castings may extend upwardly above the level of the pipes 81 to aid in supporting the floor 70 of the overlying portion of the tunnel chamber. The convolutions of the heaters 78 may be supported by castings 89, also having portions extending upwardly as indicated at 90, Fig. 12, to aid in supporting the tunnel chamber floor portion 70.

A top fire box 92 is located at the top of the decoration fusing or maturing portion of the lehr tunnel at a place slightly to the rear of the rear bottom fire box, as shown in Fig. 5. The top fire box 92 comprises a transversely extending burner or combustion chamber 93, Figs. 5 and 12. This chamber may be substantially as wide as the tunnel chamber and may be provided at one end with a burner block 94 having a port 95 with which a burner 96 is associated. The burner 96 may discharge a combustible fuel or fuel mixture into the chamber 93 transversely of the space above the lehr tunnel. The products of combustion may pass from the chamber 93 rearwardly through a port 97 in the rear wall of the chamber 93 at the side of the lehr tunnel opposite the burner into a mixing or diffusion chamber 98. Thence, such products of combustion may pass through a port 99 in the middle portion of the rear wall of the chamber 98 into a delivery chamber 100, as shown in Figs. 5 and 11.

From the delivery chamber 100, the products of combustion may pass downwardly through a bottom outlet 101, which may be substantially co-extensive in length and width with the chamber 100, into a forwardly extending heating passage 102, Figs. 5 and 12. The bottom of the flue 102 constitutes the ceiling of the tunnel chamber 21 in the decoration fusing or maturing portion of such tunnel and may be made of transversely corrugated metallic sheet material as indicated at 103. This corrugated metallic sheet material may be supported at intervals throughout the length of the decoration fusing or maturing portion of the tunnel by transversely extending I-beams 104, the ends of which may be disposed in recesses in the side walls of the lehr tunnel as clearly shown for one of these I-beams in Fig. 12. The bottom wall of the chambers 93 and 98 constitutes the top wall of a portion of the heating passage 102 and may be made of refractory material as shown.

The passage 102 may be completely confined to the decoration fusing and maturing portion of the tunnel, as will be clear from Fig. 5. Such passage opens at its forward end into the lower end of a vertically extending heating chamber 105. A pair of air heaters 106, each comprising a plurality of vertically spaced coils having transversely extending straight air conducting pipe portions, are located in the heating chamber 105 as shown in Figs. 5, 11 and 18. Air supply pipes 107, which are embedded for part of their lengths in the insulating and refractory material at the top of the fire box structure (see Figs. 5 and 11), are connected with the upper members of the respective heaters 106 and supply air to such heaters. The lower members of the air heaters 106 are connected to pipes 108 which extend forwardly through the wall structure at the front of the chamber 105 and are connected by suitable pipe fittings 109, Figs. 5 and 11, with heated air discharge pipes 110. The latter extend forwardly of the lehr tunnel in the upper corner portions of the tunnel chamber 21 through most of the preheating portion of the lehr. The pipes 110 are closed at their forward ends which may be located at the rear of a downwardly stepped extreme forward end portion of the top wall of the lehr tunnel, as shown in dot-and-dash lines for one of these pipes in Fig. 1. Each of the pipes 110 is provided at intervals with jet holes 111, Figs. 1, 3 and 17, at the inner side thereof for discharging jets 112, Fig. 17, of preheated air from the upper corner portions of the lehr tunnel chamber toward the middle portion thereof. A longitudinally extending deflector or series of deflectors 113 may be located at the top of the tunnel chamber intermediate the pipes 110 (see Figs. 1, 3 and 17). Each such deflector may have downwardly and inwardly inclined side walls 114, Fig. 17, by which the jets of preheated air from the pipes 110 are directed downwardly at opposite sides of the longitudinal median line chamber, thereby setting up transverse circulations of gaseous media in the tunnel atmosphere of the preheating portion of the tunnel, substantially as indicated by the series of arrows 115 and the series of arrows 116 in Fig. 17.

The spent products of combustion and gases at the top of the heating chamber 105 may pass therefrom through top outlets 117 into vertical stacks 118, see Figs. 5 and 18.

It will be noted that the combustion heating means at the top of the lehr tunnel supplies heat throughout substantially the entire length and width of the decoration fusing and maturing portion of the lehr by radiation through the transversely corrugated ceiling of this portion of the lehr tunnel chamber. Part of the heat evolved by the operation of such combustion heating means is supplied to the preheating portion of the lehr through the medium of the jets of air discharged into the lehr tunnel at intervals along the length of such preheating portion. This arrangement obviates need of a forwardly extending heating passage or passages from the top fire box at the top of the preheating portion of the lehr in order to supply heat thereto and thus makes for simplicity and economy of construction of this portion of the lehr tunnel. The jets of heated air introduced into the upper part of the tunnel of the preheating portion of the lehr serve to introduce heat into the atmosphere in such portion of the tunnel and to cause desirable transverse circulatory movements of gaseous media therein, thereby aiding in providing desirable uniformity of temperature controlling conditions throughout any transverse plane in the preheating portion of the lehr tunnel. They also perform the important function of driving out fumes which would otherwise interfere with the firing and maturing of the decoration on the ware.

The lehr tunnel may be provided adjacent to its forward extremity, as at a place slightly to the rear of the front stack 50, with a top vent 119, which may be controlled by a pivoted top closure or damper 120, as shown in Fig. 1. As shown in Fig. 3, a second, more rearwardly located top vent, indicated at 121, may also be provided in the preheating portion of the lehr. The top vent 121 may be controlled by a pivoted top closure or damper 122. Adjustment of one or both of the top closures or dampers 120 and 122 may be employed to aid in controlling drift of tunnel atmosphere in the preheating portion of the lehr. Ordinarily it is desirable to have a slight forward drift of the tunnel atmosphere. The vents 119 and 121, and especially the rear vent 121, serve to remove from the tunnel chamber fumes resulting from the heating of the ceramic decorating material.

The rapid cooling portion of the lehr is provided with longitudinally extending cooling air discharge pipes 123. These are located in the upper corner portions of this part of the tunnel chamber as indicated in Fig. 13, are closed at their forward ends, and are connected at their rearward ends with supply pipes 124. These supply pipes may extend through the reannealing and slow cooling portion of the tunnel in the upper corner portions of the tunnel chamber to the extreme rearward end of such portion of the lehr. At that place, each of the pipes 124 may be turned upwardly and extended through the roof structure at 125, Fig. 9 for connection with an external cooling air supply pipe 126.

The cooling discharge pipes 123 in the rapid cooling portion of the lehr are provided at intervals along their length with jet holes 127 at the inner sides thereof, Figs. 5 and 13. Jets of cooling air from these jet holes are directed inwardly from the pipes 123 toward the middle portion of the upper part of the tunnel chamber and may be directed downwardly near the middle portion of such chamber by baffles, such as are indicated at 128, Figs. 5 and 13, so as to set up transverse circulations in the tunnel atmosphere in this portion of the lehr tunnel as indicated by the generally circular series of arrows in Fig. 13. Thus, the cooling air, which has been warmed to the desired degree by passage through the supply pipes 124 in the reannealing and slow cooling portion of the lehr, will act directly on the tunnel atmosphere and on the glassware in the rapid cooling portion of the lehr. The temperature of such glassware may thus be lowered from the relatively high decoration fusing temperature to the upper annealing temperature of the ware during the passage of such ware through the rapid cooling portion of the lehr.

The reannealing and slow cooling portion of the lehr may be controlled as to the temperature gradient therein by the hereinbefore described temperature controlling provisions with which it is provided to effect desirably slow and uniform cooling of the ware passing therethrough. The pipes 124 and the air therein provide some influence on the temperature within this portion of the lehr because of the interchange of heat between the tunnel atmosphere and the air within these pipes. The main control is effected by the provisions at the bottom of the lehr. As hereinbefore has been pointed out, the air supply means at the bottom of this portion of the lehr introduce jets of air into the tunnel chamber at intervals along the length thereof. These, together with heat from the pipes 72, constitute the main influence in securing the gradual reduction of temperature of the glassware desired.

In the accelerated cooling portion of the lehr, air discharge pipes 129 extend in the upper corner portions of the lehr tunnel, Figs. 9, 10 and 14, and discharge jets of air toward the inclined side walls 130 of deflectors 131 so as to set up circulations of air and gaseous media within this portion of the lehr tunnel substantially as shown by the circular series of arrows in Fig. 14. The cooling provisions in this portion of the lehr may be substantially like those which have been previously disclosed by me in my Patent No. 2,244,113, granted June 3, 1941, for Lehr and method of treating glassware therein. Such cooling provisions may be such as to control the direction of movement of the gaseous media in the accelerated cooling rear end portion of the lehr tunnel, so as to give either a forward or rearward component thereto as service conditions may require.

The present invention makes effective use of a suitable air supply system in conjunction with the combustion heating and structural features of the lehr. Such an air supply system may include one or more air blowers or other source of supply of air under pressure. In the illustrative embodiment of the invention shown in the drawings, a front blower 132, Fig. 3, and a rear blower 133, Fig. 10, are employed in conjunction with suitably connected pipes to supply air in the amounts and at the pressures required for the use of such air at different places in the lehr. The front blower 132 supplies air to a forwardly extending main air delivery pipe 134, Fig. 3, and also to a rearwardly directed main air delivery pipe 135. A branch 136 of the forwardly extending pipe 134 is provided for each stack 57, Fig. 1, and is arranged to supply air to an air ejector nozzle 137 that is located within such stack. The air ejector nozzle is adapted to discharge air upwardly through the stack to aid in creating and maintaining the desired draft therein.

The forwardly extending pipe 134 may be provided with a branch or extension 138, Fig. 1, divided into branches 139 and 140, respectively. The branch 139 leads to an air ejector nozzle 141 in the front stack 50. It will be understood that a similar branch may be provided for the other front stack 50.

The branch 140 may lead to the burner 35, Figs. 1 and 2, to supply air to the latter to aid combustion of the fuel discharged by the burner nozzle and to give the desired velocity to the fuel mixture if oil or a low pressure gaseous fuel is being used.

The rearwardly extending pipe 135 has a branch 142, Figs. 3 and 5, leading downwardly to the burner 61, Figs. 5 and 6. The pipe 134 has a further branch 143, leading to the burner 96 for the upper fire box (see Figs. 5 and 12). A branch 144, Fig. 5, is provided to supply air to the air ejector of the stack 118. A branch 145, Figs. 5, 7 and 9 is provided for the air ejector 146 in the stack 77, Fig. 9.

The rear blower 133 supplies air through the forwardly directed pipes 147 and 148, Fig. 10. There is a pipe 147 leading to each discharge pipe 129 in the accelerated cooling portion of the lehr as shown in Fig. 10. The pipe 148 may extend forwardly above the lehr tunnel, Figs. 9, 7 and 5 in the order named, and be operatively connected with the pipes 107 leading to the heaters 106 in the air heating chamber 105, as hereinbefore described. Another forwardly extending pipe, indicated at 149, Figs. 10 and 9, supplied by the blower 133, may be provided for and connected with each of the hereinbefore mentioned pipes 126, Fig. 9, by which cooling air is delivered to the pipes 124 and connected discharge pipes 123.

It will be understood that the various air supply pipes may be individually controlled by the use of suitable dampers or control valves (not shown) and that the arrangement just described of particular pipes connected with the respective blowers may be varied by the use of only one blower or of more than two blowers or in various other ways which may be found useful or convenient in connection with any particular installation and which will be obvious to those skilled in the art from the description herein given of an illustrative air supply system.

In operation, glassware entering the lehr tunnel at the front end thereof may be heated to the decoration fusing temperature during the passage of such glassware through the preheating portion of the lehr. The operation of the bottom combustion heating means and/or the input of heat into the preheating portion of the heating tunnel through the use of the jets of heated air in the top portion of the tunnel may be varied according to the amount of heat in the glassware when such glassware enters the lehr tunnel, according to the shape and thickness of the walls of the individual articles of glassware, according to the loading of the lehr conveyor, and according to other pertinent conditions which are likely to be encountered in practice.

The heating of the glassware in the decoration fusing and maturing portion of the lehr will be mainly by radiation from the top of the tunnel although the heating means at the bottom of this portion of the lehr cooperates with the top heating means to provide the desired temperature controlling conditions in this portion of the lehr tunnel.

In the preheating portion of the lehr and in the portions of the lehr subsequent to the decoration fusing and maturing portion, the jets of air which are introduced into these portions of the lehr tunnel contribute importantly to the desired control and regulation of temperature conditions and atmosphere therein. The air heaters contemplated by the invention may be located within the heating passages or chambers of the combustion heating means so as to assure effective and economical heating of the air with but little, if any, extra structure being required. Since the products of combustion do not enter the ware treatment chamber or contact with the ware, a lehr embodying any suitable available fuel, including oil and various gases which are not suitable for use in an open-fired lehr, may be used.

The invention is not limited to the details as shown in the drawings and herein described as various changes therein and modifications thereof will readily occur to those skilled in the art.

I claim:

1. In a lehr, an elongate tunnel, heating means comprising a combustion chamber located beneath a portion of said tunnel adjacent to but spaced rearwardly of the front end of said tunnel, means for supplying a combustible mixture to said combustion chamber, means providing a heating passage located in part directly above said combustion chamber and directly beneath said tunnel and extending forwardly of the combustion chamber to the front end of the tunnel out of direct communication with the interior of said tunnel and in heat exchanging relation with the bottom wall thereof, and means for passing products of combustion and heated gases from said combustion chamber rearwardly from said combustion chamber and then upwardly into said heating passage.

2. In a lehr, an elongate tunnel, heating means comprising a combustion chamber located beneath a portion of said tunnel adjacent to but spaced rearwardly of the front end of said tunnel, means for supplying a combustible mixture to said combustion chamber, means providing a heating passage located in part directly above said combustion chamber and directly beneath said tunnel and extending forwardly of the combustion chamber to the front end of the tunnel out of direct communication with the interior of said tunnel and in heat exchanging relation with the bottom wall thereof, and means for passing products of combustion and heated gases from said combustion chamber rearwardly from said combustion chamber and then upwardly into said heating passage, said last named means being constructed and arranged to provide a plurality of ports respectively spaced in the direction of length of the tunnel and each extending transversely of the bottom of said heating passage for substantially the full width thereof and each adapted to direct part of the heated products of combustion and heated gases from said combustion chamber into said heating passage.

3. In a lehr, an elongate tunnel, means providing a heating passage extending longitudinally of the tunnel directly there-beneath from the front end thereof for part of the length of such tunnel out of direct communication with the interior of said tunnel and in heat exchanging relation with the bottom wall thereof, a combustion chamber located beneath said heating passage intermediate the length of said passage and in heat exchanging relation with the heating passage, means for supplying a combustible mixture to said combustion chamber, means for passing products of combustion and heated gases from said combustion chamber rearwardly from said combustion chamber beneath a portion of said heating passage and thence upwardly into said heating passage, and means providing a pair of vertical flues at the sides of said tunnel in communication with said heating passage at the opposite sides of the latter rearwardly of the front end of said heating passage.

4. In a lehr, an elongate tunnel, means providing a heating passage extending longitudinally of the tunnel directly there-beneath from the front end thereof for part of the length of such tunnel out of direct communication with the interior of said tunnel and in heat exchanging relation with the bottom wall thereof, a combustion chamber located beneath said heating passage intermediate the length of said passage and in heat exchanging relation with the heating passage, means for supplying a combustible mixture to said combustion chamber, means for passing products of combustion and heated gases from said combustion chamber rearwardly therefrom beneath a portion of said heating passage and thence upwardly into said heating passage, means providing a pair of vertical flues at the sides of said tunnel in communication with said heating passage at the opposite sides of the latter rearwardly of the front end of said heating passage, stacks operatively connected with the upper ends of said flues, and air ejector means associated with said stacks for causing a draft therein.

5. In a lehr, an elongate tunnel, means providing two communicating aligned heating passages extending longitudinally of the lehr tunnel beneath the front end portion thereof in heat exchanging relation with the bottom wall of that portion of said tunnel, a combustion chamber located beneath the foremost of said heating passages intermediate the length thereof, means for introducing a combustible mixture into said combustion chamber, means for passing products of combustion and heated gases from said combustion chamber into said foremost heating passage at a place rearwardly of said combustion chamber, a second combustion chamber operatively connected with the rear end of the second of said heating passages for discharging heated products of combustion and gases into said second heating passage, means for supplying a combustible mixture to said second combustion chamber, a damper at the juncture of said heating passages for controlling passage of gases from the rearmost heated passage into the foremost heating passage, and separate exhaust means respectively communicating with the foremost heating passage adjacent to but rearwardly of its front end and with the rearmost heating passage adjacent to but rearwardly of its juncture with the foremost heating passage.

6. In a lehr, an elongate tunnel, means providing a longitudinally extending heating passage extending beneath the floor of said tunnel in heat exchanging relation therewith from the front end of the tunnel for a substantial part of the length thereof, separate means respectively located at longitudinally spaced places along said heating passage for producing and supplying products of combustion to said heating passages at a plurality of different places respectively placed along the length thereof, a plurality of exhaust means respectively connected with said heating passage at different places along the length thereof, said tunnel having a plurality of vents in its top wall in the portion thereof above said heating passage, said vents respectively being located at different places along the length of said portion of the tunnel, and means for controlling said vents.

7. In a lehr, an elongate tunnel having a preheating portion extending from the front end of the tunnel for only part of the length thereof, hydrocarbon fuel combustion heating means located beneath said tunnel and constructed and arranged to heat the bottom wall of the preheating portion of said tunnel, an air heater located in heat exchanging relation with part of said combustion heating means, means for passing air through said air heater and thence rearwardly of the tunnel and for discharging jets of preheated air into the interior of a portion of the tunnel that is located rearwardly of said preheating portion.

8. In a lehr, an elongate tunnel, hydrocarbon fuel combustion heating means constructed and arranged to heat the bottom wall of the tunnel from its forward end for part of the length thereof, a pair of metallic pipes extending beneath the bottom of a further portion of said tunnel in heat exchanging relation with the interior of the tunnel, said pipes being connected with said combustion heating means to receive products of combustion and heated gases therefrom, a pair of air heaters, each comprising coils in heat exchanging relation with part of said combustion heating means, means for supplying air under pressure to said coils, and means for conducting heated air from said coils rearwardly of said tunnel adjacent to said pipes and for discharging jets of air at a plurality of places spaced longitudinally of the tunnel transversely against said pipes and thence upwardly into the interior of a portion of said tunnel.

9. In a lehr, an elongate tunnel, hydrocarbon fuel combustion heating means located above an intermediate portion of said tunnel and comprising a heat conductive wall common to said heating means and to said intermediate portion of said tunnel and means for producing and passing heated products of combustion against said common heat conductive wall to supply heat through said wall to the interior of said intermediate portion of said tunnel, an air heater comprising coils located in heat exchanging relation with said combustion heating means, means for supplying air under pressure to said coils, and means for conducting preheated air from said coils longitudinally of a portion of the tunnel forwardly of said heating means and for discharging jets of preheated air into such last named portion of the tunnel at intervals along the length thereof.

10. In a lehr, an elongate tunnel, hydrocarbon fuel combustion heating means located above an intermediate portion of said tunnel and comprising a heat conductive wall common to said heating means and to said intermediate portion of said tunnel, means for producing and passing heated products of combustion against said common heat conductive wall to supply heat through said wall to the interior of said intermediate portion of said tunnel, an air heater comprising coils located in heat exchanging relation with said combustion heating means, means for supplying air under pressure to said coils, and means for conducting preheated air from said coils longitudinally of a portion of the tunnel forwardly of said heating means and for discharging jets of preheated air into such portion of the tunnel at intervals along the length thereof, means for heating the bottom of said tunnel from the front end of the tunnel rearwardly beyond said first named heating means, and means within the upper part of said tunnel in a portion thereof located rearwardly of said first named heating means for discharging jets of cooling air into the interior of said tunnel.

11. In a decorating lehr, a tunnel comprising successive preheating, decoration fusing or maturing, rapid cooling, reannealing and slow cooling, and accelerated cooling portions, means for transporting glassware through said portions of the tunnel in the order named, hydrocarbon fuel combustion heating means for heating the bottom wall of the tunnel from the front end thereof to approximately the end of its rapid cooling portion by passing heated products of combustion against said bottom wall, heating pipes for conducting part of the products of combustion produced by said combustion heating means rearwardly beneath the reannealing and slow cooling portion of said lehr tunnel, an air heater comprising coils located in heat exchanging relation with said combustion heating means, means for supplying air under pressure to said coils, means for conducting preheating air away from said coils beneath the reannealing and slow cooling portion of the tunnel and for discharging jets of the preheated air against said heating pipes and thence into the reannealing and slow cooling portion of the tunnel at a plurality of different places along the length thereof, and means located at the top of the decoration fusing or maturing portion of the tunnel for directing heat downwardly into said tunnel from the top thereof.

12. In a decorating lehr, a tunnel comprising successive preheating, decoration fusing or maturing, rapid cooling, reannealing and slow cooling and accelerated cooling portions, means for transporting glassware through said portions of the tunnel in the order named, hydrocarbon fuel combustion heating means for heating the bottom wall of the tunnel from the front end thereof to approximately the end of its rapid cooling portion by passing heated products of combustion against said bottom wall, heating pipes for conducting part of the products of combustion produced by said combustion heating means rearwardly beneath the reannealing and slow cooling portion of said lehr tunnel, an air heater comprising coils located in heat exchanging relation with said combustion heating means, means for supplying air under pressure to said coils, means for conducting preheating air away from said coils beneath the reannealing and slow cooling portion of the tunnel and for discharging jets of the preheated air against said heating pipes and thence into the reannealing and slow cooling portion of the tunnel at a plurality of different places along the length thereof, hydrocarbon fuel combustion heating means constructed and arranged to supply heat through the top wall of the decoration fusing or maturing portion of the tunnel to the interior thereof, an air heater comprising coils located in heat exchanging relation with said last named combustion heating means, means for supplying air under pressure to said last named coils, and means for conducting preheated air from said last named coils longitudinally within the upper part of the preheating portion of the tunnel toward the front end thereof and for discharging jets of the preheated air within said preheating portion of the tunnel at intervals along the length thereof.

13. In a lehr, an elongate tunnel, means for transporting glassware longitudinally through the tunnel, heating means associated with the tunnel and comprising fire boxes and heating passages in heat exchanging relations with walls of the tunnel, stacks operatively connected with said heating passages, burners arranged to discharge combustible fuel mixtures into the fire boxes, air discharge members located in various parts of the tunnel, air ejectors operatively connected with said stacks and an air supply system comprising a source of supply of air under pressure and air delivery means operatively connecting said source with said burners, said air discharge pipes within the tunnel, and with said air ejectors.

DONALD G. MERRILL.